United States Patent
Davis et al.

(10) Patent No.: US 8,464,053 B2
(45) Date of Patent: Jun. 11, 2013

(54) SYSTEMS, METHODS, AND MEDIA FOR RETRANSMITTING DATA USING THE SECURE REAL-TIME TRANSPORT PROTOCOL

(75) Inventors: Jay Davis, Hillsdale, NJ (US); Michael Zak, Ramat Gan (IL); Sasha Ruditsky, Fair Lawn, NJ (US); Tsahi Levent-Levi, Givat Shmuel (IL)

(73) Assignee: Radvision Ltd, Tel Aviv (IL)

( * ) Notice: Subject to any disclaimer, the term of this patent is extended or adjusted under 35 U.S.C. 154(b) by 1073 days.

(21) Appl. No.: 11/899,294

(22) Filed: Sep. 5, 2007

(65) Prior Publication Data

US 2009/0063858 A1    Mar. 5, 2009

(51) Int. Cl.
*H04L 29/06* (2006.01)

(52) U.S. Cl.
USPC .......... 713/168; 713/150; 713/151; 713/160; 713/161

(58) Field of Classification Search
USPC .......................... 713/168, 150, 151, 160, 161
See application file for complete search history.

(56) References Cited

U.S. PATENT DOCUMENTS

| | | | |
|---|---|---|---|
| 7,308,101 B2 * | 12/2007 | Wing | 380/257 |
| 7,570,765 B1 * | 8/2009 | Eslambolchizadeh | 380/257 |
| 7,657,036 B2 * | 2/2010 | Hsu et al. | 380/281 |
| 7,746,853 B2 * | 6/2010 | Zhang | 370/389 |
| 7,764,669 B2 * | 7/2010 | Mills et al. | 370/352 |
| 2004/0196849 A1 * | 10/2004 | Aksu et al. | 370/395.2 |
| 2006/0010321 A1 * | 1/2006 | Nakamura et al. | 713/168 |
| 2006/0062393 A1 * | 3/2006 | Hsu et al. | 380/281 |
| 2007/0101133 A1 * | 5/2007 | Liu et al. | 713/168 |
| 2007/0113085 A1 | 5/2007 | Naslund et al. | |
| 2007/0201512 A1 * | 8/2007 | Mills et al. | 370/467 |
| 2007/0237144 A1 * | 10/2007 | Adhikari et al. | 370/392 |
| 2008/0235722 A1 * | 9/2008 | Baugher et al. | 725/32 |

OTHER PUBLICATIONS

The International Search Report and the Written Opinion of the International Searching Authority, International Patent Application No. PCT/US08/74794, Nov. 10, 2008.

* cited by examiner

*Primary Examiner* — Edan Orgad
*Assistant Examiner* — Bradley Holder

(57) ABSTRACT

Systems, methods, and media for retransmitting data using the SRTP are provided. In some embodiments, methods for retransmitting data using the SRTP are provided. The methods include: receiving at least one data unit associated with a media session; determining the index of the at least one data unit; determining the session key of the media session using the index; authenticating the at least one data unit using the session key; and retransmitting the at least one data unit.

8 Claims, 3 Drawing Sheets

SYSTEMS, METHODS, AND MEDIA FOR RETRANSMITTING DATA USING THE SECURE REAL-TIME TRANSPORT PROTOCOL

TECHNICAL FIELD

The disclosed subject matter relates to systems, methods, and media for retransmitting data using the Secure Real-time Transport Protocol (SRTP).

BACKGROUND

The SRTP is a profile of the Real-time Transport Protocol (RTP) that can provide confidentiality, message authentication, and replay protection to the RTP traffic by sending and receiving data over a network supporting the RTP and the Internet Protocol (IP) using one or more encrypted sessions. Replay protection refers to any mechanisms that can detect and drop replayed packets. A packet is said to be replayed when it is stored by an unauthorized entity and re-injected into the network at a later point in time: the packet replay is a type of attack intended to disrupt the integrity of confidential communications and/or the stability of network traffic.

The SRTP standard requires senders to transmit data units, such as cells or packets, in accordance with a correct time sequence by consecutively incrementing the sequence number of the data units. This incrementing method may work well if the data units are routed directly to receivers from the senders that have the full knowledge of the data being sent. In practice, however, there may be one or more intermediary applications and/or devices that, for instance, need to receive and forward the data units. There may be also applications and/or devices that need to receive and process the data in the data units before retransmitting them to the receivers.

Data units, such as cells or packets, can be lost or reordered during the transitional forwarding and/or processing by one or more intermediary applications and/or devices. The SRTP standard, however, does not support any mechanisms for preventing such transitional loss or reordering of data units by intermediary senders, such as the applications or devices that forward and/or process the data units.

A jitter buffer can be used to retransmit transitional data units in the same incremental order in which they were sent from a sender. The buffer can be used to overcome reordering of data units. The buffer can also handle loss of data units. For instance, applications using the buffer can send empty units if one or more data units are lost. However, the jitter buffer adds delay between receiving and retransmitting the transitional data units. Also, sending empty units, which receivers should eventually drop, adds processing delays and may increase the network traffic load.

SUMMARY

Systems, methods, and media for retransmitting data using the SRTP are provided. In some embodiments, systems for retransmitting data using the SRTP are provided. The systems can include: a receiver component capable of receiving at least one data unit associated with a media session; a processing component in communication with the receiver component, the processing component capable of: determining the index of the at least one data unit, determining the session key of the media session using the index, and authenticating the at least one data unit using the session key; and a transmitter component in communication with the processing component, the transmitter component capable of retransmitting the at least one data unit.

In some embodiments, methods for retransmitting data using the SRTP are provided. The methods include: receiving at least one data unit associated with a media; determining the index of the at least one data unit; determining the session key of the media session using the index; authenticating the at least one data unit using the session key; and retransmitting the at least one data unit.

In some embodiments, computer-readable media containing computer-executable instructions that, when executed by a processor, cause the processor to perform a method for retransmitting data using the SRTP are provided. The method includes: receiving at least one data unit associated with a media session; determining the index of the at least one data unit; determining the session key of the media session using the index; authenticating the at least one data unit using the session key; and retransmitting the at least one data unit.

In some embodiments, systems for retransmitting data using the SRTP are provided. The systems can include: a receiver means capable of receiving at least one data unit associated with a media session; a processing means in communication with the receiver means, the processing means capable of: determining the index of the at least one data unit, determining the session key of the media session using the index, and authenticating the at least one data unit using the session key; and a transmitter means in communication with the processing means, the transmitter means capable of retransmitting the at least one data unit.

DETAILED DESCRIPTION

Systems, methods, and media for retransmitting data using the SRTP are provided. In some embodiments of the disclosed subject matter, systems, methods, and media are provided for retransmitting data using the SRTP by modifying the behavior of intermediary senders, such as a proxy, a translator, and an MCU. The SRTP standard does not provide any mechanism for the intermediary senders to authenticate and/or process data units or to detect and handle loss of data units. It only provides such mechanisms for a receiver. By adding some of the functionalities of the receiver, the intermediary senders can receive, authenticate, process, and retransmit the data units to the receiver.

Figure 1:
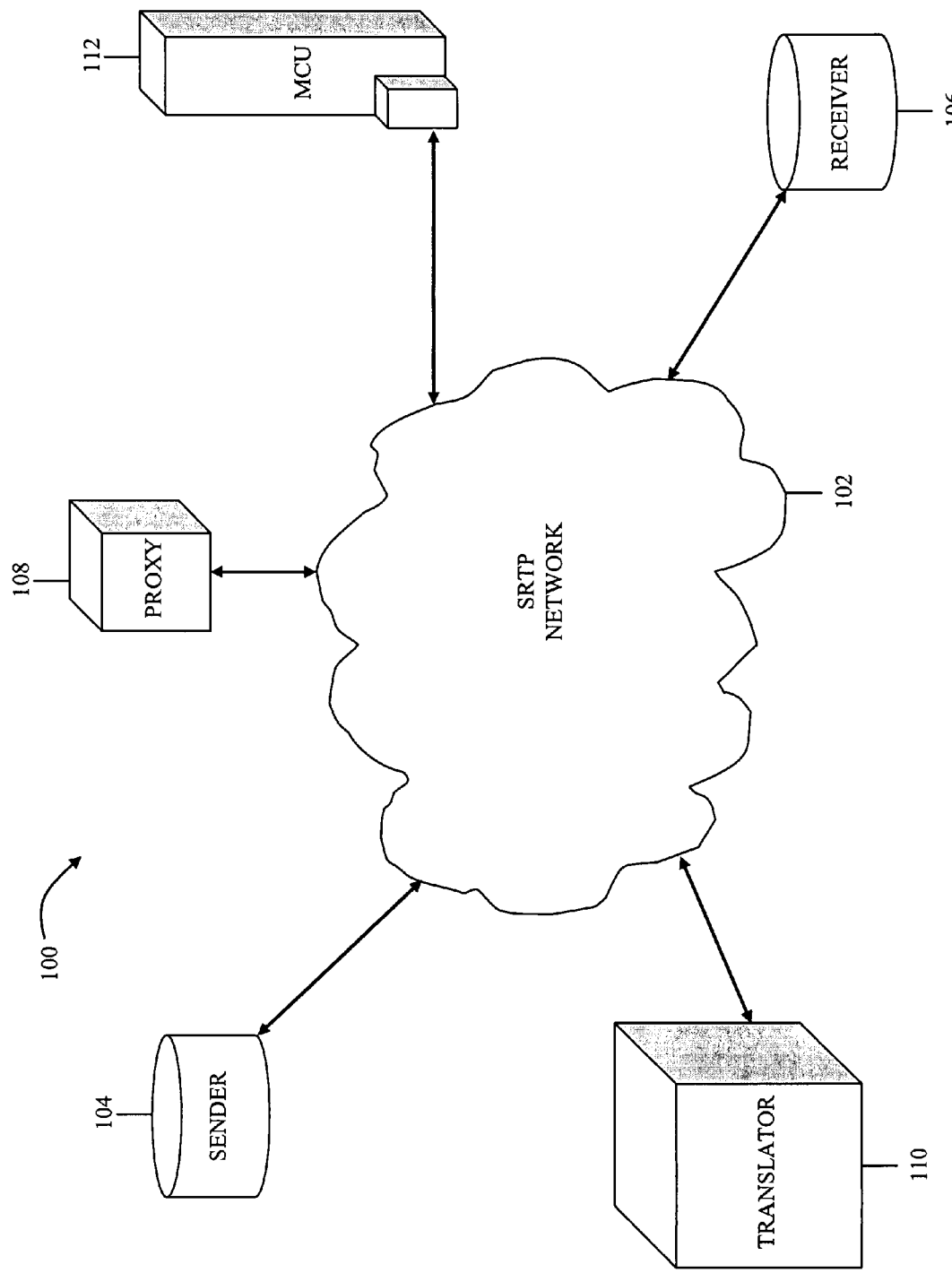
FIG. 1 is a schematic diagram of a system for retransmitting data using the SRTP in accordance with some embodiments of the disclosed subject matter.

Referring to FIG. 1, a system 100 includes an SRTP network 102, a sender 104, a receiver 106, a proxy 108, a translator 110, and a Multipoint Conferencing Unit (MCU) 112.

SRTP network 102 can be a local area network (LAN), a wide area network (WAN), a wireless network, a cable network, the Internet, and/or various other suitable networks that are capable of supporting the SRTP.

Sender 104 and receiver 106 can be a program, such as a software application, a library of functions and/or procedures, one or more background daemon processes, one or more instances of executable thread, and/or various other suitable programs that implement the SRTP standard for generating, sending, and receiving data units. In some embodiments, the data units are SRTP packets. Sender 104 and receiver 106 also can be a device containing one or more processors, such as a general-purpose computer, a special-purpose computer, a digital processing device, a server, and/or various other suitable devices, that can run the program, or implement the SRTP standard for generating, sending, and receiving data units.

In general, sender 104 can receive data in RTP form, SRTP form, 3G form, or various other forms, generate the corresponding data units, and send the data units using SRTP to receiver 106 over media sessions. Receiver 106 then can receive and authenticate the data units and extract the data contained in the corresponding data units. In some embodiments, data also comes from a file stored on the sender 104. In some embodiments, the media sessions are encrypted.

After receiving the data units for transmission, for example, sender 104 can determine the 48-bit index of each of the corresponding data units using a 32-bit ROC and the 16-bit sequence number of each of the data units. The ROC can count the number of times the sequence number has been reset to zero by incrementing the count by one every time the sequence number passes through the maximum sequence number, which is 65,535. The index of each data unit can indicate the location of the data unit within a sequence. The index also can be used to derive the session key. The session key can be used to encrypt the data in the data units. Sender 104 can then send the data units using SRTP to receiver 106.

Receiver 106, on the other hand, can receive data units, determine the correct index of each of the data units, and derive the master key from the index. The master key can be then used to identify the session key, which, in turn, can be used to authenticate the data units and/or to decrypt the encrypted portion of the data units.

Each of proxy 108, translator 110, and MCU 112 also can be any of the aforementioned types of program and/or device. Proxy 108 can receive data units from sender 104, authenticate the data units, and retransmit the data units to receiver 106.

Translator 110 can receive data units from sender 104 or proxy 108, authenticate the data units, translate the data units, and retransmit the data units to receiver 106. For example, translator 110 can receive and authenticate data units from sender 104 in a first type of network, translate the data units for transmission in a second type of network, and forward the data units to receiver 106 in the second type of network.

MCU 112 can provide multipoint secure real-time audio or video conferencing by receiving and authenticating data units and retransmitting the data units to one or more receivers 106. MCU 112 also can be used to connect multiple end-points, such as a telephone, a mobile phone, a personal data assistant, an email device, and/or various other suitable devices that can be used to participate in an audio or video conference.

Figure 2:
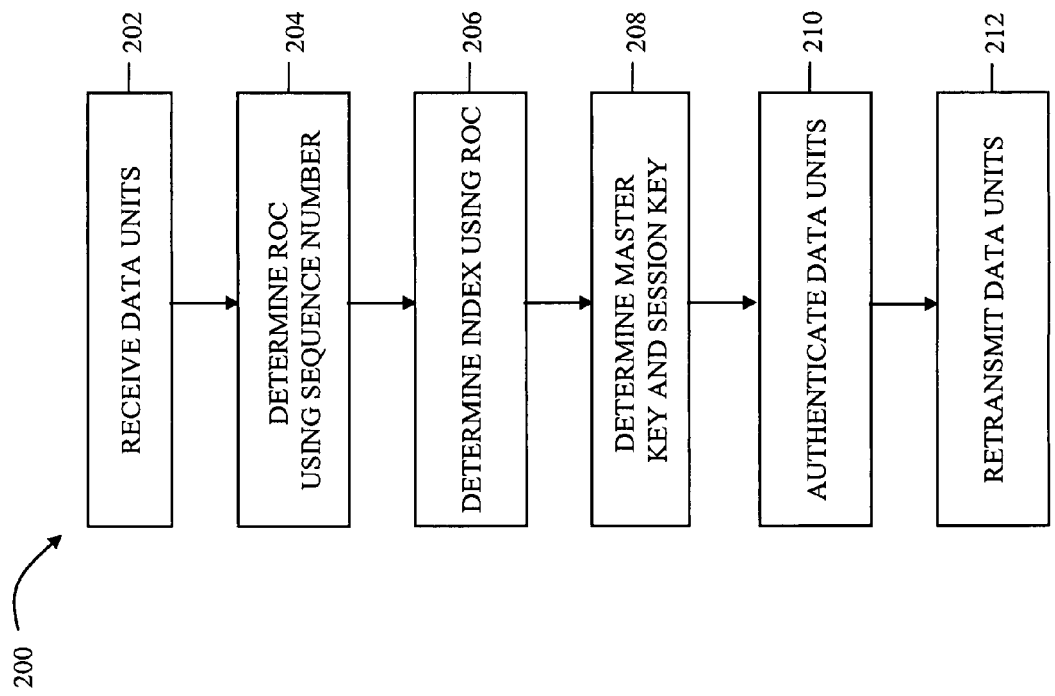
FIG. 2 illustrates a method for retransmitting transitional data in accordance with some embodiments of the disclosed subject matter.

Referring to FIG. 2, a method 200 retransmits transitional data units in accordance with some embodiments.

As shown, at 202, one or more data units are received. In some embodiments, the data units are received from sender 104. In some embodiments, the data units are received from proxy 108. In some embodiments, the data units are received from translator 110. The data units can also come from sources other than sender 104, proxy 108, and translator 110.

At 204, the correct value of the ROC associated with the current session is determined for each of the data units using the means contained in the data units. In some embodiments, it is the 16-bit sequence number of each SRTP packet. In some embodiments, the sequence number of the current maximum index of the data units is also used to determine the correct value of the ROC. The current maximum index refers to the greatest of the indices that have been determined using the data units received thus far. In some embodiments, the sequence number of the maximum index is initialized to the sequence number of the first received data unit.

At 206, the index of each of the data units is determined using the sequence number and the value of the ROC determined at 204. In some embodiments, the index is calculated using the following equation:

$$\text{Index} = (2^{16}) * (ROC) + SEQ,$$

where SEQ refers to the sequence number of a data unit. In some embodiments, the index is the SRTP index.

At 208, the index is used to determine the master key, which, in turn, is used to determine the session key. In some embodiments, a Master Key Identifier (MKI), which is carried within each of the data units, is used to identify the master key. In some embodiments, a <From, To> list is used to find the master key. The <From, To> list contains two 48-bit index values that specify the range of indices within which a certain master key is valid. In some embodiments, for example, the master key for an SRTP packet can be found by determining whether the 48-bit SRTP index of the SRTP packet belongs to the interval defined by the <From, To> list.

At 210, the data units are authenticated using the session key identified at 208. It is the session key that can be used directly for cryptographic transformation, such as encryption and decryption, and message authentication. In some embodiments, authenticating data units encompasses checking the message integrity. In some embodiments, authenticating data units also encompasses authenticating the origin of the data units.

In some embodiments, the message contained in the data units is decrypted, processed, and re-encrypted before the data units are retransmitted. In some embodiments, processing the data units includes translating the data units. For example, the data units received from one type of LAN can be translated to be retransmitted over another type of LAN. For instance, a sequence of data units that have been generated by sender 104 within a Token Ring or a Wireless LAN can be translated to be transmitted to receiver 106 over an Ethernet LAN.

At 212, the data units are retransmitted. In some embodiments, the data units are copied and retransmitted to more than one receiver 106. For example, MCU can retransmit the data units to multiple end-points.

Figure 3:
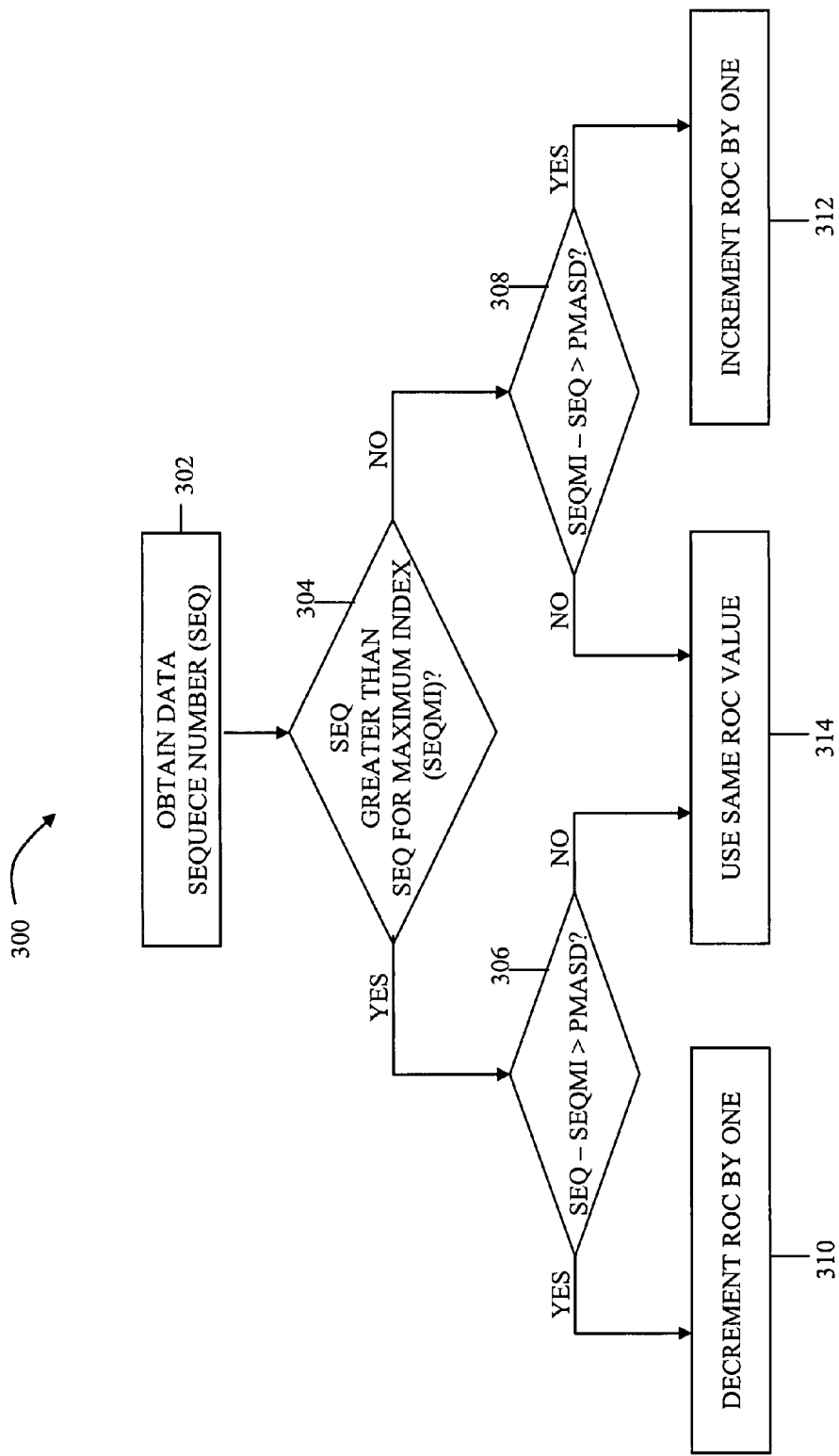
FIG. 3 illustrates a method for determining the correct value of a ROC in accordance with some embodiments of the disclosed subject matter.

Referring to FIG. 3, a method 300 determines the correct value of an ROC in accordance with some embodiments.

As shown, at 302, the sequence number (SEQ) of each of the received data units is obtained. In some embodiments, the ROC is initially set to zero when a data unit is first observed and the sequence number for the current maximum index (SEQMI) is initially set to the SEQ of the first observed data unit. In some embodiments, the ROC value and/or the SEQMI value are obtained from sender 104 using out-of-band signaling, such as SRTP key-management signaling.

At 304, it is determined whether the SEQ of each of the data unit is greater than the SEQMI. If, on one hand, it is determined at 304 that the SEQ is greater than the SEQMI, the SEQMI is subtracted from the SEQ at 306 to measure the forward sequential distance between the current data unit and the data unit having the SEQMI within the current session.

At 306, it is further determined whether the measured forward sequential distance is greater than a predetermined maximum allowable sequential distance (PMASD). In some embodiments, the PMASD is set to 32,767, which is half of the maximum value of the 16-bit SEQ. If it is determined at 306 that the forward sequential distance is greater than the PMASD, the ROC value is decremented by one at 310. If, however, it is determined at 306 that the forward sequential distance is smaller than the PMASD, the current ROC value is saved unmodified at 314.

If, on the other hand, it is determined at 304 that the SEQ is smaller than the SEQMI, the SEQ is subtracted from the SEQMI at 308 to measure the backward sequential distance. At 308, it is further determined whether the backward sequential distance is greater than the PMASD. If it is determined at 308 that the backward sequential distance is greater than the PMASD, the ROC value is incremented by one at 312. If, however, it is determined at 308 that the backward sequential distance is smaller than the PMASD, the current ROC value is saved unmodified at 314.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system that receives contents in a first Secure Real-time Transport Protocol (SRTP) transmission from a transmitter and that retransmits said contents in a second SECURE REAL-TIME TRANSPORT PROTOCOL (SRTP) transmission to a receiver, comprising:
    a device processor, said device processor being enabled to initialize, update, and maintain a rollover counter, and process at least one data unit by decrypting, translating, and re-encrypting said at least one data unit, wherein said device processor:
    receives as part of said first Secure Real-time Transport Protocol (SRTP) transmission said at least one data unit associated with a media session;
    determines a value of a rollover counter based on one of a 16-bit sequence number of said data unit in said first Secure Real-time Transport Protocol (SRTP) transmission, and a sequence number of a current maximum index of said data unit, wherein said sequence number of said maximum index is initialized to said sequence number of a first received data unit;
    determines an index of said at least one data unit based on a sequence number and said value of said rollover counter;
    determines a master key based at least on a <From,To>list, said list comprising two values that specify the range of indices within which a certain master key is valid;
    determines a session key of said media session using said determined index and said value of said rollover counter; and
    authenticates said at least one data unit using said session key; and
    retransmits said at least one data unit in said second Secure Real-time Transport Protocol (SRTP) transmission using said session key determined using said index and said value of said rollover counter from said first SECURE REAL-TIME TRANSPORT PROTOCOL (SRTP) transmission.

2. The system of claim 1, wherein translating said at least one data unit comprises modifying a format of said at least one data unit.

3. A method for retransmitting data using Secure Real-time Transport Protocol (SRTP) in a device that receives contents in a first Secure Real-time Transport Protocol (SRTP) transmission from a transmitter and that retransmits said contents in a second Secure Real-time Transport Protocol (SRTP) transmission to a receiver, comprising:
    receiving as part of said first Secure Real-time Transport Protocol (SRTP) transmission at least one data unit associated with a media session, using a device processor, said device processor being enabled to initialize, update, and maintain a rollover counter, and process at least one data unit by decrypting, translating, and re-encrypting said at least one data unit;
    determining a value of said rollover counter based on one of a 16-bit sequence number of said data unit in said first Secure Real-time Transport Protocol (SRTP) transmission, and a sequence number of a current maximum index of said data unit, wherein said sequence number of said maximum index is initialized to said sequence number of a first received data unit, using a device processor;
    determining an index of said at least one data unit based on a sequence number and said value of said rollover counter, using a device processor;
    determining a master key based on a <From,To>list, said list comprising two values that specify the range of indices within which a certain master key is valid;
    determining a session key of said media session using said determined index and said value of said rollover counter, using a device processor;
    authenticating said at least one data unit using said session key, using a device processor; and
    retransmitting said at least one data unit in said second Secure Real-time Transport Protocol (SRTP) transmission using said session key determined using said index and said value of said the rollover counter from said first Secure Real-time Transport Protocol (SRTP) transmission, using a device processor.

4. The method of claim 3, wherein translating said at least one data unit comprises modifying a format of said at least one data unit.

5. A non-transitory computer-readable medium containing computer-executable instructions that, when executed by a processor, cause said processor to perform a method for retransmitting data using Secure Real-time Transport Protocol (SRTP) in a device that receives contents in a first Secure Real-time Transport Protocol (SRTP) transmission from a transmitter and that retransmits said contents in a second Secure Real-time Transport Protocol (SRTP) transmission to a receiver,
    said device processor being enabled to initialize, update, and maintain a rollover counter, and process at least one data unit by decrypting, translating, and re-encrypting said at least one data unit, said the method comprising:
    receiving as part of said first Secure Real-time Transport Protocol (SRTP) transmission at least one data unit associated with a media session;
    determining a value of said rollover counter based on one of a 16-bit sequence number of said data unit in said the first Secure Real-time Transport Protocol (SRTP) transmission, and a sequence number of a current maximum index of said data unit, wherein said sequence number of said maximum index is initialized to said sequence number of a first received data unit;
    determining an index of said at least one data unit based on a sequence number and said the value of said rollover counter;

determining a master key based on a <From,To>list, said list comprising two values that specify the range of indices within which a certain master key is valid;

determining a session key of said media session using said determined index and said value of said the rollover counter;

authenticating said at least one data unit using said session key; and retransmitting said at least one data unit in said second Secure Real-time Transport Protocol (SRTP) transmission using said session key determined using said index and said value of said rollover counter from said first Secure Real-time Transport Protocol (SRTP) transmission.

6. The computer-readable medium of claim 5, wherein translating said at least one data unit comprises modifying a format of said at least one data unit.

7. A system that receives contents in a first Secure Real-time Transport Protocol (SRTP) transmission from a transmitter and that retransmits said contents in a second SECURE REAL-TIME TRANSPORT PROTOCOL (SRTP) transmission to a receiver, comprising:

a means for receiving that receives as part of said first Secure Real-time Transport Protocol (SRTP) transmission at least one data unit associated with a media session;

a means for processing in communication with said means for receiving, said means being enabled to initialize, update, and maintain a rollover counter, and process at least one data unit by decrypting, translating, and re-encrypting said at least one data unit, wherein said means for processing:

determines a value of said rollover counter based on one of a 16-bit sequence number of said data unit in said first Secure Real-time Transport Protocol (SRTP) transmission, and a sequence number of a current maximum index of said data unit, wherein said sequence number of said maximum index is initialized to said sequence number of a first received data unit;

determines an index of said at least one data unit based on a sequence number and said value of said rollover counter;

determines a master key based on a <From,To>list, said list comprising two values that specify the range of indices within which a certain master key is valid;

determines a session key of said media session using said determined index and said value of said the rollover counter; and authenticates said at least one data unit using said session key; and a means for transmitting in communication with said means for processing, that retransmits said at least one data unit in said second Secure Real-time Transport Protocol (SRTP) transmission using said session key determined using said index and said value of said rollover counter from said first Secure Real-time Transport Protocol (SRTP) transmission.

8. The system of claim 7, wherein translating said at least one data unit comprises modifying a format of said at least one data unit.

* * * * *